United States Patent [19]

Pompier et al.

[11] Patent Number: 5,297,606
[45] Date of Patent: Mar. 29, 1994

[54] COMBINATION OF A TIRE AND RIM FOR AVOIDING THE DISLODGING OF THE BEADS OF THE TIRE

[75] Inventors: Jean P. Pompier, Volvic; Jean-Claude Blazy, Chatel-Guyon, both of France

[73] Assignee: Compagnie Generale des Etablissements Michelin - Michelin & Cie, Clermont-Ferrand Cedex, France

[21] Appl. No.: 826,887

[22] Filed: Jan. 28, 1992

[30] Foreign Application Priority Data

Feb. 8, 1991 [FR] France .................. 91 01574

[51] Int. Cl.$^5$ ............................................. B60C 15/02
[52] U.S. Cl. ................................ 152/539; 152/544; 152/379.3
[58] Field of Search .............. 152/454, 516, 539, 544, 152/DIG. 9, 378, 381.3, 381.4, 379.3, DIG. 17

[56] References Cited

U.S. PATENT DOCUMENTS

| | | | |
|---|---|---|---|
| 3,910,336 | 10/1975 | Boileau | 152/539 |
| 4,246,948 | 1/1981 | Sarkissian | 152/539 |
| 4,353,403 | 10/1982 | Ruip | 152/DIG. 9 |
| 4,554,960 | 11/1985 | Pompier . | |
| 4,561,482 | 12/1985 | Tavazza et al. | 152/381.4 |
| 4,606,390 | 8/1986 | Shute | 152/381.4 |
| 4,878,527 | 11/1989 | Noma . | |
| 4,940,069 | 7/1990 | Nakaski et al. . | |
| 5,044,413 | 3/1991 | Noma et al. . | |
| 5,070,921 | 12/1991 | Wada et al. | 152/544 |
| 5,107,915 | 4/1992 | Shimomura et al. | 152/544 |

FOREIGN PATENT DOCUMENTS

| | | | |
|---|---|---|---|
| 0593545 | 3/1960 | Canada | 152/381.3 |
| 0117835 | 9/1984 | European Pat. Off. | 152/544 |
| 167283 | 1/1986 | European Pat. Off. . | |
| 0170085 | 2/1986 | European Pat. Off. | 152/381.4 |
| 434403 | 6/1991 | European Pat. Off. . | |
| 2425743 | 12/1975 | Fed. Rep. of Germany | 152/544 |
| 0053103 | 3/1988 | Japan | 152/544 |
| 2-200504 | 8/1990 | Japan | 152/539 |
| 3-143710 | 6/1991 | Japan | 152/516 |
| 1150101 | 4/1985 | U.S.S.R. | 152/381.3 |
| 2074954 | 11/1981 | United Kingdom | 152/454 |

Primary Examiner—Michael W. Ball
Assistant Examiner—Nancy T. Krawczyk
Attorney, Agent, or Firm—Brumbaugh, Graves, Donohue & Raymond

[57] ABSTRACT

In order to improve the resistance to dislodging of the beads of a tire under severe conditions of travel, the combination in accordance with the invention is formed of said tire and a rim (1) the seat of which, placed on the outside of the vehicle, has a circumferential protrusion (2). The base (3) of the bead (B) intended to rest against said seat has a width ($L_1$) which is at least equal to the axial distance (L) separating the rim flange (11) from the summit (A) of the protrusion (2), a meridian profile adapted to that of the seat, while the rubber bead filler has a modulus of elasticity in extension at least equal to 4 MPa, measured under an elongation of 10%.

4 Claims, 1 Drawing Sheet

COMBINATION OF A TIRE AND RIM FOR AVOIDING THE DISLODGING OF THE BEADS OF THE TIRE

BACKGROUND OF THE INVENTION

The present invention relates to a combination formed of a rim provided with a circumferential bead-retaining protrusion and a tire with radial carcass reinforcement without an independent inner tube. It also concerns a special rim provided with at least one circumferential protrusion.

It is known that, under the combined effect of the multiple forces present between the contact surface of the tire and the ground, and with numerous torques affecting the wheel, substantial stresses are imposed on the beads of the tire, particularly in the event of a substantial loss of pressure and travel over a path of small radius. These stresses cause the axial displacement, towards the hollow part of the rim employed, of the bead which is furthest from the center of the path.

Various means are known which are directed at overcoming this problem, said means generally consisting of selecting a suitable shape for the rim profile. One of such means consists in retaining the bead by a circumferential protrusion which is arranged between the circumferential mounting groove and the frustoconical seat of the rim, said protrusion being generally referred to as a "hump". At present there are different forms of circumferential protrusions of standardized shape (for example, ETRTO standards). One can distinguish between:

the simple "hump" protrusion, having, in meridian section, a profile in the form of a circular arc;

the flat, so-called "flat hump", protrusion having, in meridian section, a profile which effectively comprises a flat portion.

Whether it be a "hump" or "flat hump", the diameter of the circumferential protrusion has a value which permits the bead of the tire to move past it upon the mounting on the rim. The compromise obtained with respect to the dislodging properties of the bead and the mounting-dismounting properties is not satisfactory.

There thus appeared a rim having asymmetrical protrusions ("asymmetric hump"): one protrusion has a height above the rim seat which varies circumferentially, passing from a maximum value to a minimum value along one diameter and from a minimum value to a maximum value along a second diameter, which is shifted axially with respect to the first diameter.

In the case of known tire beads, it does not seem that this rim solution has solved the problem, despite a greater height of protrusion than in the case of a circular protrusion or a flat protrusion.

In connection with the use of tires on rims with circumferential protrusion, it therefore appears necessary to modify the structure of the beads of these tires. French Patent 2 548 970 discloses such a modification; it concerns a bead of a tire intended to be mounted and used on a rim with flat protrusion. This bead is characterized by the combination of the meridian profile of its base, adapted to the profile of the seat of the mounting rim, and the axial location of its bead wire, said combination permitting a very substantial clamping of the bead on the rim without penalizing the mounting of the tire on the rim.

This solution is not ideal since the beads loosen from the rim seats under severe conditions of travel at pressures other than zero, these pressure values furthermore varying greatly as a function of the tolerances provided on the rims.

SUMMARY OF THE INVENTION

In order to solve said problems while obtaining a good compromise between the mounting or dismounting of the tire on the rim, the adherence upon rotation of the bead to the rim and the dislodging of the bead, the invention proposes an improved solution which utilizes the combination of the meridian profile of the rim on which the tire will be mounted with the shape and structure of the bead or beads of the tire.

Thus, the combination of the present invention is applicable to a light-vehicle tire without independent inner tube, having a radial carcass reinforcement and a tread reinforcement formed of at least two plies of cords or cables inclined at a slight angle with respect to the circumferential direction, the carcass reinforcement being anchored in each bead by winding around a substantially nonextensible bead wire, and of a rim provided with two flanges, a circumferential groove, and, as shown in the drawing, at least on the outer side of the vehicle, a rim seat forming an angle of $\delta$ of $5° \pm 1°$ with the axis of rotation of the combination and provided with a circumferential protrusion, symmetrical in revolution around said axis of rotation, the point A of said protrusion radially furthest from° the axis of rotation being at an axial distance L from the flange of the rim. The above combination is characterized, in accordance with the invention, by the fact that, seen in meridian section, the rim has a seat provided with a circumferential protrusion the point of which furthest from the axis of rotation is located at a radial distance H, measured between the point C of the seat having the minimum diameter and said point A, of between 3 and 4 mm, this point A being connected axially to the outside to the frustoconical generatrix of the seat, forming an angle $\delta$ of $5° \pm 1°$ with the axis of rotation of the combination, by a circular arc 15 having its center on the perpendicular to the axis of rotation passing through A and of radius $R_2$ of between 6 and 8 mm, and a second circular arc of radius tangent to the first arc of radius $R_2$ and to the frustoconical generatrix of the seat, $R_3$ being equal to $2 \pm 1$ mm, and axially to the inside to the mounting groove 4 by a frustoconical generatrix 16 forming an angle $\theta$ of between 10° and 30° with the axis of rotation and of an axial width $\lambda$ at least equal to 5 mm; by the fact that the bead intended to be mounted on the rim seat provided with the circumferential protrusion has a base the meridian profile of which is adapted to the meridian profile of said seat, which meridian profile has, axially on the inside from a point spaced from the vertical wall of the bead by an amount of between 0.9 L−1 mm and 0.9 L, a generatrix in the form of a circular arc of radius $p$ of between 4 and 8 mm, the chord subtending this generatrix forming an angle of between 20° and 40° with the axis of rotation, said generatrix being extended by a final quasi-cylindrical generatrix, the ends axially to the inside of said generatrices being axially spaced from the vertical wall of the bead by the amounts L and $L_1$ which is greater than L by at most 5 mm, respectively; and by the fact that the vulcanized rubber surrounding the complex consisting of bead wire, carcass reinforcement and the turn-up of the latter axially on both sides of said complex and at least in the part radially to the inside of an axis parallel to the axis of rotation passing through the end of the turn-up of the carcass reinforcement, has a secant modulus of elasticity in extension under an elongation of 10% equal to at least 4 MPa.

By quasi-cylindrical generatrix, there is to be understood a generatrix which forms an angle of between −5° and +5° with the axis of rotation of the combination tim-tire, that is to say, a generatrix which forms an angle of 5° with the axis of rotation but may be located on both sides of said axis of rotation.

Preferably, the base of the tire bead intended to rest on the rim seat with protrusion also has a circular arc tangent to the vertical wall of the bead and to a frustoconical generatrix forming an angle $\alpha$ of between 0° and 15° with the axis of rotation of the combination, said generatrix being extended axially on the inside by a second generatrix forming an angle $\beta$ of between 20° and 35° with the axis of rotation, in its turn extended by a quasi-cylindrical generatrix which precedes the circular generatrix of radius $\rho$ mentioned above, the ends axially to the inside of said generatrices being spaced axially from he vertical wall of the bead B by the amounts $L_{10}$ equal to 0.4 L±1 mm, $L_{11}$ equal to 0.7 L±1 mm, and $L_{12}$ between 0.9 L−1 mm and 0.9 L, respectively.

The region of connection between the vertical wall of the bead and the first frustoconical zone of the base of the bead is generally circular but can preferably be in frustoconical form, the generatrix of said surface then forming a positive angle of between 45° and 60° with the axis of rotation. This frustoconical shape allows for a better position of the bead to facilitate mounting of the tire.

In order to retain the same properties of tightness after several mountings and dismountings of the tire, the lower part of the bead covering the second frustoconical zone of angle and at most the quasi-cylindrical part which extends it, is advantageously formed of a vulcanized rubber of low modulus of elasticity of extension. The secant module of elasticity in extension of the vulcanized rubber used is preferably at most equal to 0.7 MPa under 10% elongation.

By secant module of extension, there is to be understood the value of the ratio of the stress suffered by the test piece at 10% elongation to said relative elongation of 10%.

The mounting rim, as described previously, although specifically designed for adapted beads of the tire, can be used, in accordance with the invention, for the mounting of tires having beads of normal, known shape and structure.

DESCRIPTION OF THE DRAWING

Non-limitative embodiments in accordance with the invention are described below with reference to the accompanying drawing, the sole FIG. 1 of which is a view in radial section through a plane passing through the axis of rotation of a bead of the tire with respect to the contour of the mounting rim on the outer side of the vehicle, having an improved protrusion.

In the figure, the rim contour is shown in dashed line, while the contour of the bead is shown in solid line, when the tire is not mounted on the rim and not inflated to its service pressure.

DESCRIPTION OF PREFERRED EMBODIMENT

Figure 1:
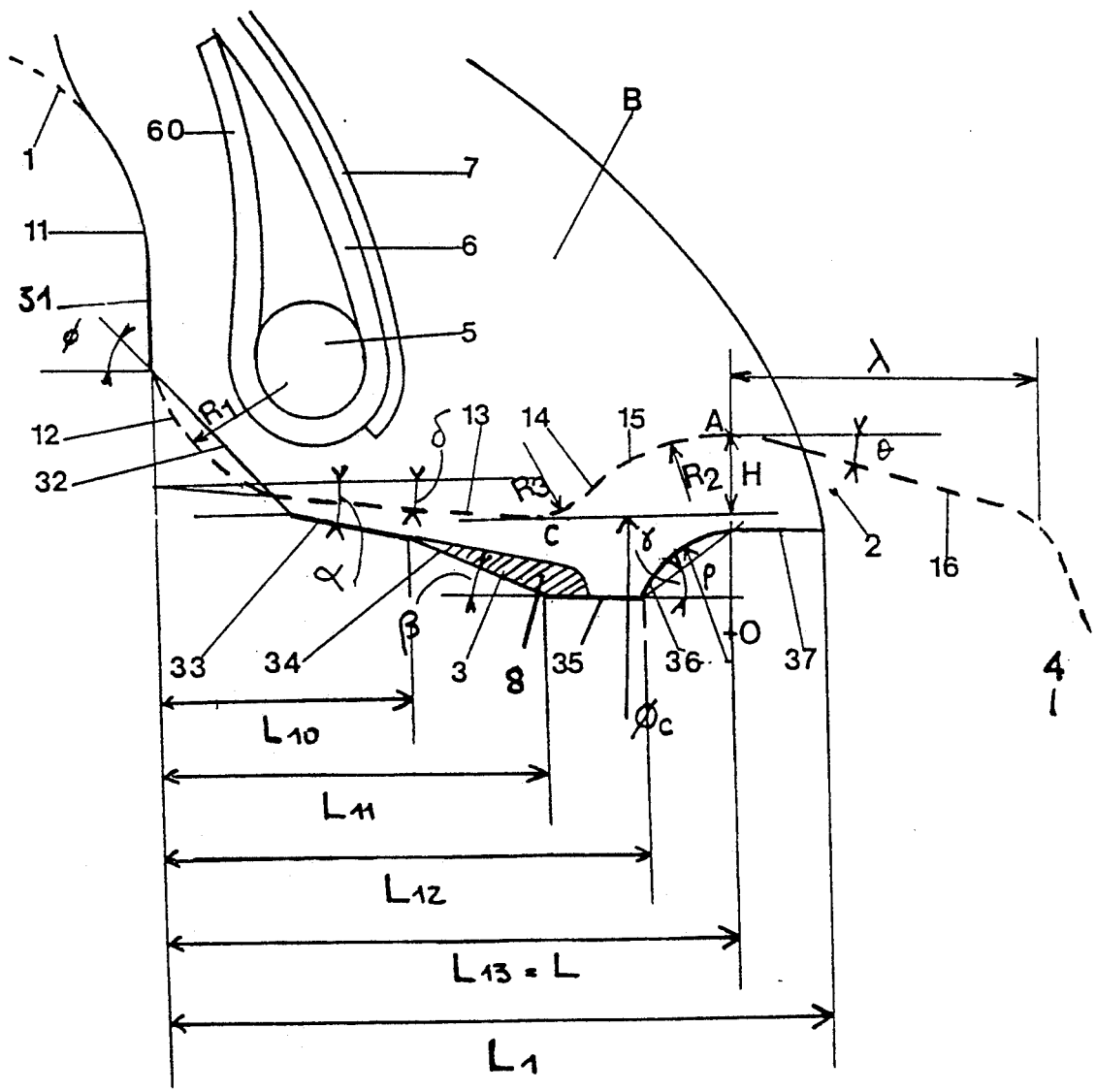

FIG. 1 shows the contour of a rim 1 of a nominal diameter of 380.2 mm. The mounting rim 1 comprises a rim flange 11 perpendicular to the axis of rotation and connected to a frustoconical generatrix 13 via a zone 12 in the form of a circular arc of maximum radius $R_1$ equal to 6.4 mm. This generatrix 13 forms an angle $\delta$ equal to 5°±1° with the axis of rotation. The rim 1 also comprises a circumferential protrusion 2 enjoying total symmetry of revolution; the points A furthest from the axis of rotation have as their geometric locus a circle centered on the axis of rotation of the rim. The points A are located axially at a distance L of 22 mm from the rim flange 1. The height H of the circumferential protrusion 2, the radial distance measured perpendicular to the axis of rotation between two straight lines parallel to said axis and passing through the summit point A of the protrusion 2 and through the point C of the generatrix 13, respectively, for which the diameter $\phi_c$ is minimum, is equal to 4 mm. The summit point A is connected axially on the outside to the point C via the circular generatrix 15 of radius of 8 mm, the center O of the circular arc 15 being on the perpendicular to the axis of rotation passing through A. The generatrix 15 is extended by a second circular arc 14 of radius $R_3$ equal to 2 mm±1 mm.

The same point A is connected to the mounting groove 4 (not shown) primarily by a frustoconical zone of generatrix 16, the inclination 8 of which with respect to the axis of rotation is 14° and the axial width of which is 11 mm.

Compared with this rim contour, in accordance with the invention the bead B of the tire, comprising a bead wire 5 around which the carcass armature 6 is anchored, has a base 3 of axial width L greater than the distance L by at most 5 mm. In the case studied and shown in FIG. 1, the contour of the base 3 of the bead B is formed of a vertical wall 31 of a frustoconical generatrix 32, two frustoconical generatrices 33 and 34, a quasi-cylindrical generatrix 35 extended axially towards the inside of a generatrix 36 of circular arc shape, the contour of the base 3 being terminated by a quasi-cylindrical generatrix 37.

The vertical wall 31 is at the same distance from the equatorial plane of the tire as the inner wall 11 of the rim flange. The generatrix 32 forms an angle $\phi$ of 48° with the axis of rotation. The generatrix 33, connected to the wall 31 by the generatrix 32, forms an angle $\alpha$ of 11° with the axis of rotation and the end of said generatrix 33 is at an axial distance $L_{10}$ of 9.5 mm from the rim flange. The generatrix 34 forms an angle $\beta$ of 24° with the axis of rotation and the end of this generatrix 34 is at an axial distance $L_{11}$ from the rim flange of 15 mm. Extending the generatrix 34 axially towards the inside, the cylindrical generatrix 35 has its axially inner end located at a distance $L_{12}$ from the flange 11, of 19 mm, and is extended by a generatrix 36 in the form of a circular arc of radius $\rho$ equal to 8 mm and the end of which is spaced from the rim flange 11 by an amount $L_{13}$ equal to L and to 22 mm. The chord which subtends the circular arc 36 forms an angle $\gamma$ of 30° with the axis of rotation of the rim-tire combination. The base 3 is terminated by a cylindrical generatrix 37 of small width equal to 3 mm.

The hatched portion 8 shows the location of the vulcanized rubber of low modulus of elasticity in extension. It goes without saying that the contour of this portion shown is the ideal, since if the raw profile of the strip of rubber necessary is well defined and controlled, the molding and the vulcanization see to it that the theoretical contour is rarely fully respected. This portion 8 is of very small volume as compared with the volume occupied by the mix of strong modulus of elasticity in tension, which mix, seen in FIG. 1, occupies the entire surface on the outside of the carcass reinforcement 6 and its turn-up 60, the ends radially to the outside of this vulcanized rubber being on both sides of the carcass reinforcement 6 located above the end of the turn-up 60. In the case studied, the mix of low modulus of elasticity is a mix having the same composition as the mix constituting the tight inner covering 7 of the tire.

The height H of the protrusion 2, which is between 3 and 4 mm, makes it possible to achieve good anti-dislodging performance of the beads, whatever the type of bead mounted on the rim 1 having this protrusion, namely performances of the same order as those obtained with the combination consisting of a tire with widened and adapted bead and a rim with standardized flat or circular circumferential protrusion. On the other hand, the combination of tire with widened bead and rim with symmetrical circumferential protrusion of revolution of height H provides excellent results since, under zero pressure, the bead is not dislodged from its initial location.

The test carried out consisted in driving a vehicle at a speed of 50 km per hour on a track having a clothoid-shaped contour, the radius of curvature of the average path of which varies progressively from infinity to 20 m. The dislodging pressure is measured. A tire, such as described in French Patent 2 548 970, mounted on a so-called "flat hump" rim shows dislodging of the bead at pressures of 0.6–0.5 bars. A combination comprising a tire with a bead such as described above, and a standardized rim with hump has the same dislodgings for pressures of 0.4–0.3 bars. The same is true of the combinations formed of a rim as described and tires having known beads, the base of which has an axial width, in the case of the size studied, of 12 mm. A combination of rim and tire as described does not show any dislodgement of the bead at 0 bar, and these results are obtained without difficulties in mounting or dismounting appearing. In fact, the presence of the generatrix 16 inclined with respect to the axis of rotation permits a provisional assumption of pressure of the bead B on the ramp 16 necessary to effect the mounting and facilitates the clearing of the protrusion 2 by the bead in alternate fashion, that is to say, first of all at a given place of the rim and then progressively over the rest of the circumference. Furthermore, the presence axially to the outside of the point A of the protrusion 2 of a circular generatrix 15 of large radius permits easy dismounting without, as shown, penalizing the anti-dislodging performance of the bead.

We claim:

1. A combination formed of a light-vehicle tire without independent inner tube, having a radial carcass reinforcement (6) and a tread reinforcement, the carcass reinforcement (6) being anchored in each bead (B) by winding around a substantially nonextendible bead wire (5), and a rim (1) provided with two flanges (11), a circumferential groove (4) and, at least on the outer side of the vehicle, a rim seat forming an angle ($\delta$) of $5° \pm 1°$ with the axis of rotation of the combination and provided with a circumferential protrusion (2) symmetrical in revolution around said axis of rotation, the protrusion having a point A which is radially furthest from the axis of rotation which point is located at an axial distance L from the rim flange (11), characterized by the fact that, seen in meridian section, the rim seat includes a first frustoconical generatrix (13) intermediate a flange and the circumferential protrusion (2), the point A of which is located at a radial distance H, measured between a point C of the seat having the minimum diameter and said point A, of between 3 and 4 mm, said point A being connected axially to the first frustoconical generatrix (13) by a circular arc (15) having its center on a perpendicular to the axis of rotation passing through A and of radius $R_2$ of between 6 and 8 mm, and a second circular arc (14) of radius $R_3$ tangent to the first arc (15) and to the first frustoconical generatrix (13) of the seat, $R_3$ being equal to $2 \pm 1$ mm, and said point A being connected axially on the inside to the circumferential groove (4) by a second frustoconical generatrix (16) forming an angle ($\theta$) of between 10° and 30° with the axis of rotation and of an axial width ($\lambda$) at east equal to 5 mm; by the fact that the bead (B) intended to be mounted on the rim seat provided with the circumferential protrusion (2) has an outer vertical wall (31) and a base (3) the meridian profile of which is adapted to the meridian profile of said seat, which meridian profile has, axially on the inside from a point spaced from the vertical wall (31) of the bead (B) by a distance ($L_{12}$) of between .9 L–1 mm and 0.9 L, a generatrix (36) in the form of a circular arc of radius ($\rho$) of between 4 and 8 mm, the chord subtending this generatrix (36) forming an angle ($\gamma$) of between 20° and 40° with the axis of rotation, said generatrix (36) in the form of a circular arc being extended by a final quasi-cylindrical generatrix (37), the ends axially to the inside of said circular arc and final quasi-cylindrical generatrices (36, 37) being axially spaced, respectively, from the vertical wall (31) of the bead (B) by the distance L and a distance ($L_1$) which is greater than L by at most 5 mm; and by the fact that the vulcanized rubber surrounding the bead wire (5) - carcass reinforcement (6) combination and the turn-up (60) of the latter axially on both sides of said combination and at least in the part radially to the inside of an axis parallel to the axis of rotation passing through the end of the turn-up (60) of the carcass reinforcement (6) has a secant modulus of elasticity in extension under an elongation of 10% equal to at least 4 MPa.

2. A combination according to claim 1, characterized by the fact that the base (3) of the bead (B) intended to rest on the rim seat with circumferential protrusion (2) also has a circular arc (32) tangent to the vertical wall of the bead (31) and to a first frustoconical generatrix (33) forming an angle ($\alpha$) of between 0° and 15° with the axis of rotation of the combination, said first frustoconical generatrix (33) being extended axially on the inside by a second frustoconical generatrix (34) forming an angle ($\beta$) of between 20° and 35° with the axis of rotation, in its turn extended by a first quasi-cylindrical generatrix (35) which precedes the circular arc generatrix (36) of radius ($\rho$), the ends axially to the inside of said first and second frustoconical generatrices (33, 34) and said first quasi-cylindrical generatrix (35) being spaced axially from the vertical wall (31) of the bead (B) by the amounts $L_{10}$ equal to 0.4 $L \pm 1$ mm, $L_{11}$ equal to 0.7 $L \pm 1$ mm and $L_{12}$ between 0.9 L–1 mm and 0.9 L, respectively.

3. A combination according to claim 2, characterized by the fact that the circular arc (32) tangent to the vertical wall (31) of the bead (B) is replaced by the generatrix (32) of a frustoconical zone, said generatrix (32) forming an angle ($\phi$) of between 45° and 60° with the axis of rotation of the combination.

4. A combination according to claim 2, characterized by the fact that the lower part of the bead, which is substantially defined radially on the inside by the second frustoconical generatrix (34) and at most all of the first quasi-cylindrical generatrix (35), radially on the outside by the extension towards the inside of the first frustoconical generatrix (33) and axially towards the inside by a quasi-vertical wall, is formed of a vulcanized rubber the secant modulus of elasticity of which, in tension under an elongation of 10%, is at most equal to 0.7 MPa.

* * * * *

UNITED STATES PATENT AND TRADEMARK OFFICE
CERTIFICATE OF CORRECTION

PATENT NO.   : 5,297,606
DATED        : March 29, 1994
INVENTOR(S)  : POMPIER et al.

It is certified that error appears in the above-identified patent and that said Letters Patent is hereby corrected as shown below:

Col. 2, line 44, "radius tangent" should read --radius $R_3$ tangent--. Col. 3, line 8, "tim-tire" should read --rim-tire--; line 22, "he" should read --the--; line 30, "angle" should read "angle $\phi$ --; line 37, "angle" should read --angle $\beta$ --. Col. 4, line 11, "flange 1" should read --flange 11--; line 19, "radius" should read --radius $R_2$--; line 27, "width" should read --width $\lambda$ --; line 32, "width L" should read --width $L_1$--. Col. 6, line 16, "east" should read --least--; line 24, ".9" should read --0.9--.

Signed and Sealed this

Sixth Day of September, 1994

BRUCE LEHMAN

*Attest:*

*Attesting Officer*          *Commissioner of Patents and Trademarks*